(12) United States Patent
Nishimura et al.

(10) Patent No.: US 9,330,704 B2
(45) Date of Patent: May 3, 2016

(54) OPTICAL INFORMATION RECORDING DEVICE, OPTICAL INFORMATION RECORDING AND REPRODUCING DEVICE, OPTICAL INFORMATION RECORDING METHOD, OPTICAL INFORMATION RECORDING AND REPRODUCING METHOD, AND OPTICAL ELEMENT

(71) Applicant: Hitachi Consumer Electronics Co., Ltd., Yokohama, Kanagawa (JP)

(72) Inventors: Koichiro Nishimura, Tokyo (JP); Toshiki Ishii, Tokyo (JP); Koji Fujita, Tokyo (JP); Taku Hoshizawa, Tokyo (JP)

(73) Assignee: Hitachi Consumer Electronics Co., Ltd., Kanagawa (JP)

( * ) Notice: Subject to any disclaimer, the term of this patent is extended or adjusted under 35 U.S.C. 154(b) by 0 days.

(21) Appl. No.: 14/443,117

(22) PCT Filed: Nov. 19, 2012

(86) PCT No.: PCT/JP2012/079891
§ 371 (c)(1),
(2) Date: May 15, 2015

(87) PCT Pub. No.: WO2014/076830
PCT Pub. Date: May 22, 2014

(65) Prior Publication Data
US 2015/0294681 A1  Oct. 15, 2015

(51) Int. Cl.
*G11B 7/0065* (2006.01)
*G03H 1/26* (2006.01)
(Continued)

(52) U.S. Cl.
CPC .............. *G11B 7/0065* (2013.01); *G03H 1/265* (2013.01); *G11B 7/128* (2013.01); *G11B 7/1353* (2013.01); *G11B 7/1369* (2013.01); *G03H 2001/0216* (2013.01); *G03H 2223/13* (2013.01)

(58) Field of Classification Search
None
See application file for complete search history.

(56) References Cited

U.S. PATENT DOCUMENTS

| 7,206,108 | B2* | 4/2007 | Tsukagoshi | .......... | G11B 7/0065 |
|-----------|-----|--------|------------|-----------|-------------|
| | | | | | 359/22 |
| 8,077,580 | B2* | 12/2011 | Ogata | ................ | G11B 7/00458 |
| | | | | | 369/103 |

(Continued)

FOREIGN PATENT DOCUMENTS

| JP | 7-104647 A | 4/1995 |
|----|------------|--------|
| JP | 2000-121820 A | 4/2000 |

(Continued)

OTHER PUBLICATIONS

International Search Report of PCT/JP2012/079891, mailed Mar. 12, 2013.

*Primary Examiner* — Peter Vincent Agustin
(74) *Attorney, Agent, or Firm* — Mattingly & Malur, PC

(57) ABSTRACT

The optical information recording and reproducing method realizes an increased number of multiplexing in recording and favorably stabilized signal recording in a manner of uniforming media consumption in angle-multiplexed recording by changing a phase of signal light on a pixel basis in a manner in which the speed of a phase change on a pixel basis is constant or is greater than or equal to a certain speed in a page and between pages when the driving speed of a phase mask changes at the time of recording. The optical information recording and reproducing method, while moving an optical element that adds phase information to a light flux which includes two-dimensional page data information in a direction that is perpendicular to an optical axis of the light flux, records the page data on the recording medium by adding the phase information to the light flux.

3 Claims, 14 Drawing Sheets

(51) Int. Cl.
*G11B 7/128* (2012.01)
*G11B 7/1369* (2012.01)
*G11B 7/1353* (2012.01)
*G03H 1/02* (2006.01)

(56) References Cited

U.S. PATENT DOCUMENTS

| | | | |
|---|---|---|---|
| 2003/0072250 A1* | 4/2003 | Dinnocenzo | G11B 7/244 369/275.1 |
| 2003/0128370 A1* | 7/2003 | De Lega | G02B 5/1871 356/521 |
| 2004/0179251 A1 | 9/2004 | Anderson et al. | |
| 2006/0286488 A1* | 12/2006 | Rogers | B82B 3/00 430/325 |
| 2007/0091399 A1 | 4/2007 | Ihas et al. | |
| 2007/0133113 A1* | 6/2007 | Minabe | G03H 1/02 359/872 |
| 2009/0034397 A1* | 2/2009 | Tanaka | G11B 7/0065 369/103 |
| 2009/0268595 A1* | 10/2009 | Fukuzawa | B82Y 10/00 369/275.3 |
| 2010/0182663 A1* | 7/2010 | Yamakawa | G11B 7/0908 359/11 |
| 2013/0052592 A1* | 2/2013 | Tonchev | G03F 1/60 430/320 |
| 2015/0294681 A1* | 10/2015 | Nishimura | G11B 7/0065 369/103 |

FOREIGN PATENT DOCUMENTS

| | | |
|---|---|---|
| JP | 2004-272268 A | 9/2004 |
| JP | 2006-343533 A | 12/2006 |

\* cited by examiner

[Fig. 9]

OPTICAL INFORMATION RECORDING DEVICE, OPTICAL INFORMATION RECORDING AND REPRODUCING DEVICE, OPTICAL INFORMATION RECORDING METHOD, OPTICAL INFORMATION RECORDING AND REPRODUCING METHOD, AND OPTICAL ELEMENT

TECHNICAL FIELD

The present invention relates to a device and a method for recording information on a recording medium by using holography, a device and a method for reproducing information that is recorded on a recording medium by using holography, and a device element that is used in the devices and the methods.

BACKGROUND ART

The Blu-ray Disc™ standard using a blue-violet semiconductor laser currently enables commercialization of optical discs for consumer use that have a recording capacity of approximately 50 GB. Henceforth, it is desired to increase the capacity of optical discs up to approximately the same as the capacity of a hard disk drive (HDD) such as 100 GB to 1 TB.

In order to realize such an ultra-high density for optical discs, however, there is necessary a new densification technology that is different from the densification technology of shortening wavelength and increasing the NA of an object lens.

While studies related to a next generation storage technology are under way, there is a focus on the hologram recording technology that records digital information by using holography.

The hologram recording technology is a technology of recording information on a recording medium by superposing signal light that is two-dimensionally modulated by a spatial light modulator and includes page data information with reference light inside a recording medium and generating refractive index modulation inside the recording medium with an interference fringe pattern that occurs at the time of superposition of the signal light and the reference light.

When the recording medium is irradiated at the time of reproducing information with the reference light that is used in recording, the hologram that is recorded on the recording medium acts as a diffraction grating and generates diffracted light. The diffracted light is reproduced, including the recorded signal light and phase information as one light.

The reproduced signal light is two-dimensionally detected at high speed by using a light detector such as a CMOS and a CCD. As such, the hologram recording technology enables instant recording of two-dimensional information on an optical recording medium by using one hologram and further enables reproducing of the information. The hologram recording technology also enables writing of multiple pieces of page data at a certain location on the recording medium in a superposed manner. Therefore, it is possible to achieve recording and reproducing of information on a large scale and at high speed.

JP-A-2004-272268 (PTL 1) is an example of the hologram recording technology. What is disclosed in this publication is a so-called angle-multiplexed recording scheme. In the angle-multiplexed recording scheme, fluxes of the signal light are concentrated on an optical information recording medium by a lens, and concurrently, the optical information recording medium is irradiated with parallel fluxes of the reference light. Then the signal light interferes with the reference light, and a hologram is recorded. Furthermore, while the angle of incidence of the reference light on the optical recording medium is changed, different pieces of page data are displayed on a spatial light modulator and are recorded in a multiplexed manner.

In addition, the subject matter disclosed in US2007/0091399A (PTL 2) is intended to stabilize the angle-multiplexed recording and reduce noise in a manner of changing the phase of the signal light on a pixel basis by interposing a phase-modulating optical element (irradiance-tailoring element, referred to as a phase mask in the present specification hereinafter) on the optical path of the signal light and driving the optical element linearly or rotationally.

CITATION LIST

Patent Literature

PTL 1: JP-A-2004-272268
PTL 2: US2007/0091399A

SUMMARY OF INVENTION

Technical Problem

The object of changing the phase of the signal light on a pixel basis is to smooth consumption of media by smoothing the intensity of the signal light with which the media is irradiated. When the phase mask is arranged on the optical path of the signal light in a fixed manner, apart of the signal light where the intensity of light is high remains locally due to the phase modulation pattern of the optical element. Thus, the disclosure of PTL 2 is intended to avoid this problem by driving the phase mask.

In this case, the speed of a phase change in a page and between pages is desirably constant or is greater than or equal to a certain speed in order to equalize recording conditions for each pixel in the page or between pages while achieving the effect disclosed in PTL 2. However, the problem of the phase mask driving method disclosed in PTL 2 is that this matter is not considered therein.

An object of the present invention is to realize an increased number of multiplexing in recording in a manner of uniforming media consumption in angle-multiplexed recording by changing the phase of signal light on a pixel basis in order for the speed of a phase change on a pixel basis to be constant or to be greater than or equal to a certain speed in a page and between pages when the driving speed of a phase mask changes at the time of recording and is to realize signal recording in which recording quality at each pixel in a page and between pages is consistently maintained and is stabilized in a favorable manner.

Solution to Problem

The above problem is resolved by, for example, correlating driving of the phase mask with the structure of the phase mask.

Advantageous Effects of Invention

According to the present invention, it is possible to realize an increased number of multiplexing in recording by uniforming media consumption in angle-multiplexed recording and realize signal recording in which recording quality at each pixel in a page and between pages is consistently maintained and is stabilized in a favorable manner.

DESCRIPTION OF EMBODIMENTS

Hereinafter, embodiments of the present invention will be described by using the drawings.

First Embodiment

Figure 2:
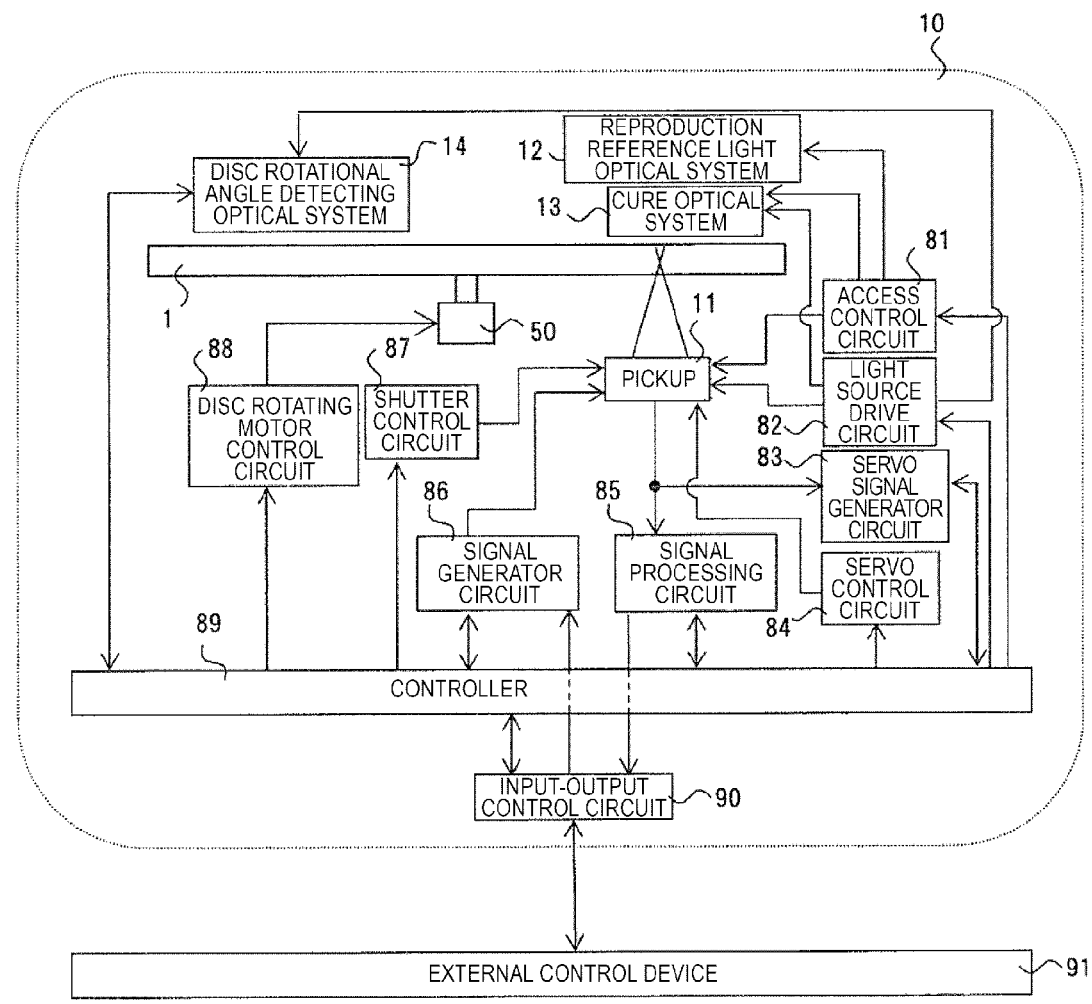
FIG. 2 is a schematic diagram representing an embodiment of the optical information recording and reproducing device.

An embodiment of the present invention will be described according to the appended drawings. FIG. 2 is a block diagram illustrating a recording and reproducing device for an optical information recording medium that records and/or reproduces digital information by using holography.

An optical information recording and reproducing device 10 is connected to an external control device 91 through an input-output control circuit 90. In a case of recording, the optical information recording and reproducing device 10 receives an information signal to record from the external control device 91 through the input-output control circuit 90. In a case of reproducing, the optical information recording and reproducing device 10 transmits a reproduced information signal to the external control device 91 through the input-output control circuit 90.

The optical information recording and reproducing device 10 is provided with a pickup 11, a reproduction reference light optical system 12, a cure optical system 13, a disc rotational angle detecting optical system 14, and a rotary motor 50. An optical information recording medium 1 is configured to be rotatable by the rotary motor 50.

The pickup 11 has a role of recording digital information on a recording medium in a manner of using holography by irradiating the optical information recording medium 1 with reference light and signal light. At this time, the information signal to record is transmitted to a spatial light modulator in the pickup 11 by a controller 89 through a signal generator circuit 86, and the signal light is modulated by the spatial light modulator.

When the information recorded on the optical information recording medium 1 is reproduced, the reproduction reference light optical system 12 generates a light wave that causes the reference light emitted from the pickup 11 to be incident on the optical information recording medium in a direction opposite to that at the time of recording. Reproduction light that is reproduced by reproduction reference light is detected by a later-described light detector in the pickup 11, and the signal of the reproduction light is reproduced by a signal processing circuit 85.

The time of irradiation of the optical information recording medium 1 with the reference light and the signal light can be adjusted by the controller 89 controlling the opening and closing time of a shutter in the pickup 11 through a shutter control circuit 87.

The cure optical system 13 has a role of generating a light beam that is used in precure and postcure of the optical information recording medium 1. Precure is a prestep of irradiating the optical information recording medium 1 with a predetermined light beam in advance before irradiating, when information is recorded at a desired position in the optical information recording medium 1, a desired position with the reference light and the signal light. Postcure is a poststep of irradiating a desired position in the optical information recording medium 1 with a predetermined light beam after information is recorded at the desired position in order that additional recording cannot be performed at the desired position.

The disc rotational angle detecting optical system 14 is used for detecting the rotational angle of the optical information recording medium 1. When the optical information recording medium 1 is adjusted at a predetermined rotational angle, the disc rotational angle detecting optical system 14 can detect a signal that corresponds to a rotational angle, and the controller 89 can control the rotational angle of the optical information recording medium 1 through a disc rotating motor control circuit 88 by using the detected signal.

A predetermined light source drive current is supplied from a light source drive circuit 82 to light sources in the pickup 11, the cure optical system 13, and the disc rotational angle detecting optical system 14. This enables a predetermined intensity of a light beam to be emitted from each light source.

The pickup 11 and the cure optical system 13 have mechanisms that enable the positions of the pickup 11 and the cure optical system 13 to slide in the radial direction of the optical information recording medium 1. The positions of the pickup 11 and the cure optical system 13 are controlled through an access control circuit 81.

A recording technology that uses the principle of angle multiplexing in holography tends to have an extremely small allowable error with respect to deviation of the angle of the reference light.

It is therefore necessary to provide a servomechanism in the optical information recording and reproducing device 10 in order to dispose a mechanism that detects the extent of deviation of the angle of the reference light in the pickup 11, generate a servo control signal with a servo signal generator circuit 83, and correct the extent of deviation through a servo control circuit 84.

The pickup 11, the cure optical system 13, and the disc rotational angle detecting optical system 14 may be simplified by integrating several optical system configurations or all optical system configurations into one configuration.

Figure 3:
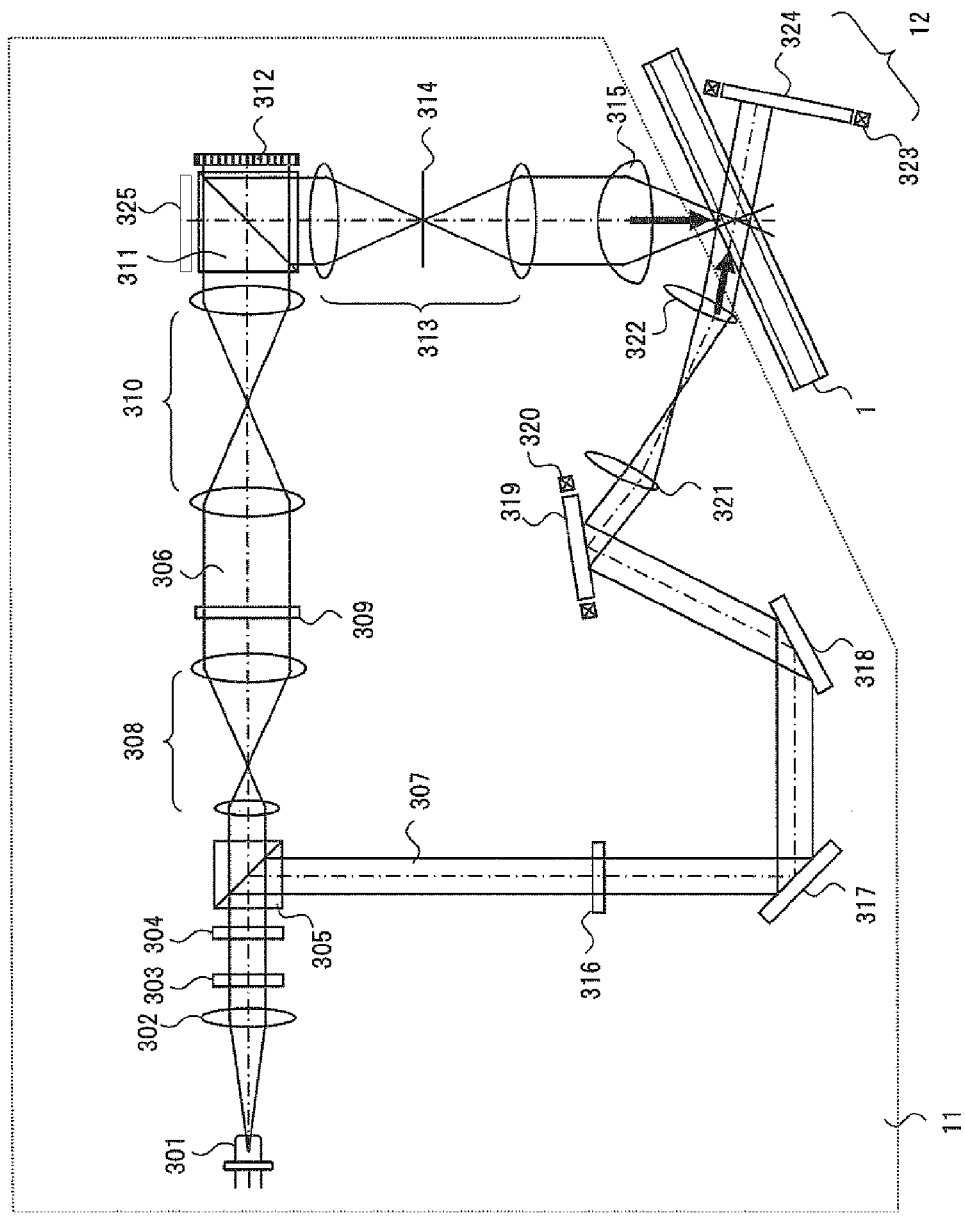
FIG. 3 is a schematic diagram representing an embodiment of a pickup in the optical information recording and reproducing device.

FIG. 3 illustrates a recording principle in an example of the basic optical system configuration of the pickup 11 in the optical information recording and reproducing device 10. A light beam emitted from a light source 301 is incident on a shutter 303 through a collimating lens 302. When the shutter 303 is opened, the light beam passes through the shutter 303, and the polarization direction of the light beam is controlled by an optical element 304 that is configured by, for example, a half-wave plate in a manner in which the light intensity ratio of p-polarized light and s-polarized light becomes a desired ratio. The light beam is then incident on a polarization beam splitter (PBS) prism 305.

The light beam that passes through the PBS prism 305 acts as signal light 306 and is incident on a spatial light modulator 312 through a phase mask 309, a relay lens 310, and a PBS prism 311 after the diameter of the light beam is increased by a beam expander 308.

The signal light to which information is added by the spatial light modulator 312 is reflected by the PBS prism 311 and is propagated through a relay lens 313 and a spatial filter 314. Afterward, the signal light is concentrated on the optical information recording medium 1 by an object lens 315.

The light beam, meanwhile, that is reflected by the PBS prism 305 acts as reference light 307 and is set to have a predetermined polarization direction by a polarization direction converting element 316 depending on when recording or when reproducing. The light beam is then incident on a galvanometric mirror 319 via a mirror 317 and a mirror 318. Since the angle of the galvanometric mirror 319 is adjustable by an actuator 320, the angle of incidence of the reference light that is incident on the optical information recording medium 1 after passing through a lens 321 and a lens 322 can be set to a desired angle. Instead of the galvanometric mirror, an element that converts the wavefront of the reference light may be used in order to set the angle of incidence of the reference light.

As such, by causing the signal light and the reference light to be incident on the optical information recording medium 1 in a superposed manner, an interference fringe pattern is formed in the recording medium, and writing the pattern into the recording medium records information. It is also possible to perform angle-multiplexed recording because the angle of incidence of the reference light that is incident on the optical information recording medium 1 can be changed by the galvanometric mirror 319.

Hereinafter, for holograms that are recorded by changing the angle of the reference light on the same area, a hologram that corresponds to one angle of the reference light is referred to as a page, and a set of pages that are angularly multiplexed in the same area is referred to as a book.

Figure 17:
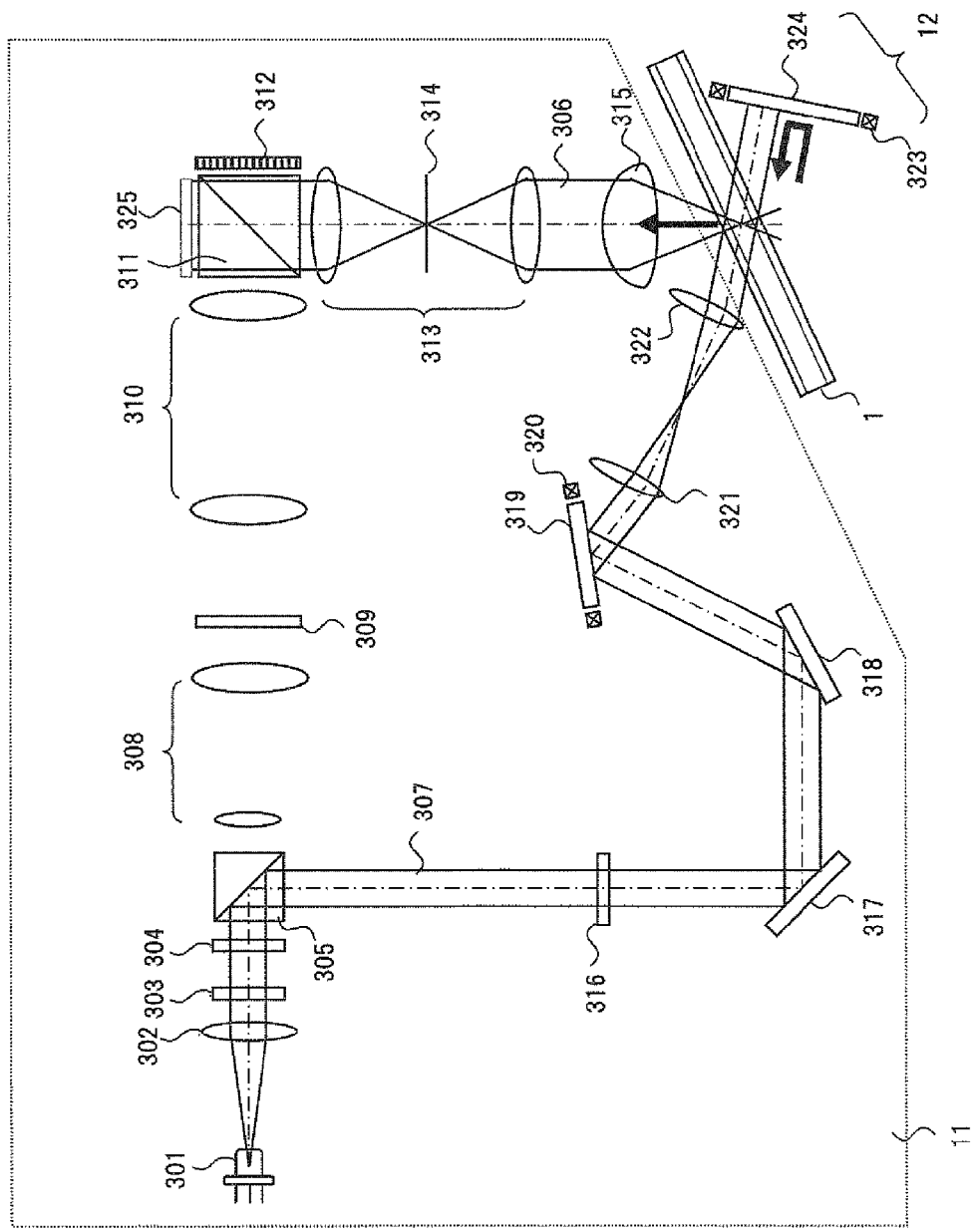
FIG. 17 is a schematic diagram representing an embodiment of the pickup in the optical information recording and reproducing device.

FIG. 17 illustrates a reproducing principle in an example of the basic optical system configuration of the pickup 11 in the optical information recording and reproducing device 10. When the recorded information is reproduced, reproduction reference light is generated by causing the reference light to be incident on the optical information recording medium 1 as described above and reflecting the light beam that passes through the optical information recording medium 1 with a galvanometric mirror 324 of which the angle is adjustable by an actuator 323.

Reproduction light that is reproduced by the reproduction reference light is propagated through the object lens 315, the relay lens 313, and the spatial filter 314. Afterward, the reproduction light passes through the PBS prism 311 and is incident on a light detector 325. This enables the recorded signal to be reproduced. Imaging elements such as a CMOS image sensor and a CCD image sensor can be used as the light detector 325. Any elements that can reproduce page data may also be used.

Figure 4:
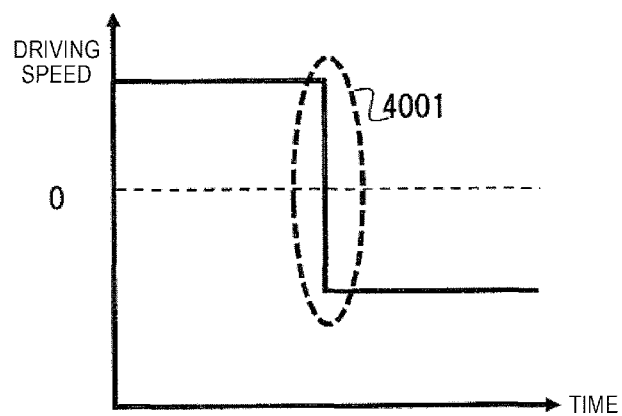
FIG. 4 is a schematic diagram representing an example of driving of the phase mask of the optical information recording and reproducing device.

The shape and a driving method of the phase mask 309 in the present embodiment will be described by using FIG. 1, FIG. 4, and FIG. 5.

Figure 1:
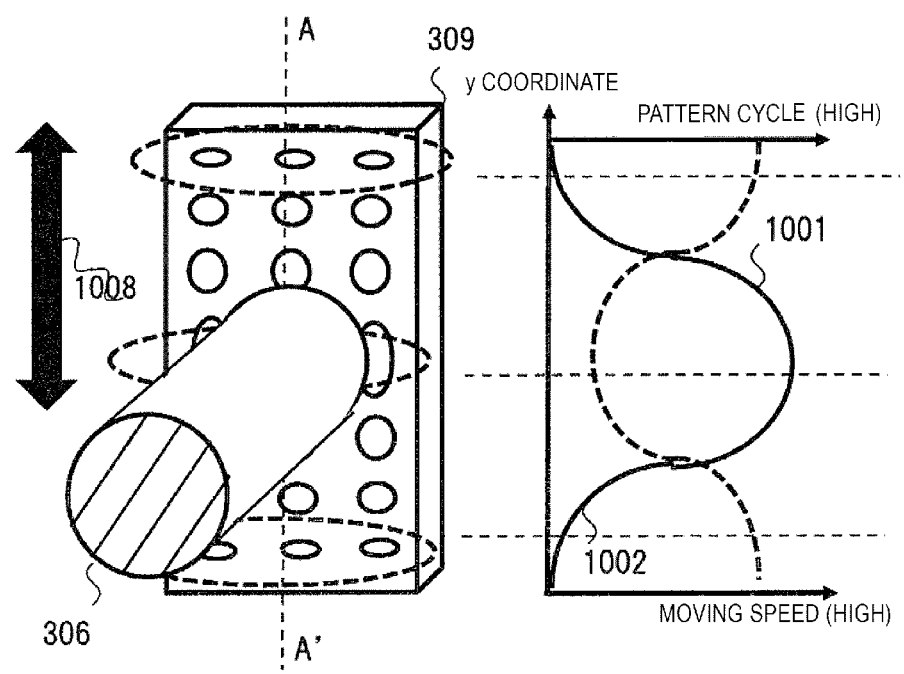
FIG. 1 is a schematic diagram illustrating an embodiment of a phase mask of an optical information recording and reproducing device, the driving speed of the phase mask, and a pattern cycle.

FIG. 1 is a diagram illustrating details of the shape and driving of the phase mask 309. The phase mask 309 has convex and concave portions that are disposed on the surface thereof perpendicular to the signal light 306. The convex and concave portions are large enough with respect to a pixel pitch as illustrated by 1001 to 1003 and are shallow enough with respect to wavelength (less than or equal to 1%). The difference between the refractive indexes of the convex and concave portions causes phase difference to be superimposed on the wavefront of the incident light flux 306. Reciprocating the phase mask in a direction that is perpendicular to the signal light 306 and is illustrated by 1008 is considered. For simplification of description, the convex and concave portions on the surface of the phase mask are assumed to have a periodic pattern in a y-axis direction in FIG. 1.

When the phase mask is driven, the driving speed is desirably constant in order to uniform a phase change in the signal light. Increasing the time of a constant speed as far as possible results in a drive profile illustrated in FIG. 4. In this case, a rapid change in speed such as 4001 causes inertial vibrations to occur and causes the device performance including recording and reproducing to be degraded. Therefore, the present embodiment uses a drive profile in which the driving speed changes periodically and smoothly along time as illustrated in FIG. 5. Projecting the drive profile in FIG. 5 in a y coordinate direction in FIG. 1 results in a drive profile such as a graph 1001 illustrated at the right of FIG. 1. The vertical axis of the graph indicates the coordinate position of the phase mask in the y direction, and the horizontal axis indicates the driving speed of the phase mask.

In angle-multiplexed recording, the speed of the phase change by the phase mask on the wavefront of the light flux 306 is desirably constant or is greater than or equal to a certain speed in order to uniform and equalize the number of multiplexing in recording and recording conditions for each pixel in the page and between pages. That is to say, this is equivalent to setting a constant speed of change of the convex and concave portions on the surface of the phase mask that passes through the light flux 306. A method of realizing this will be described by using FIG. 6.

Figure 6:
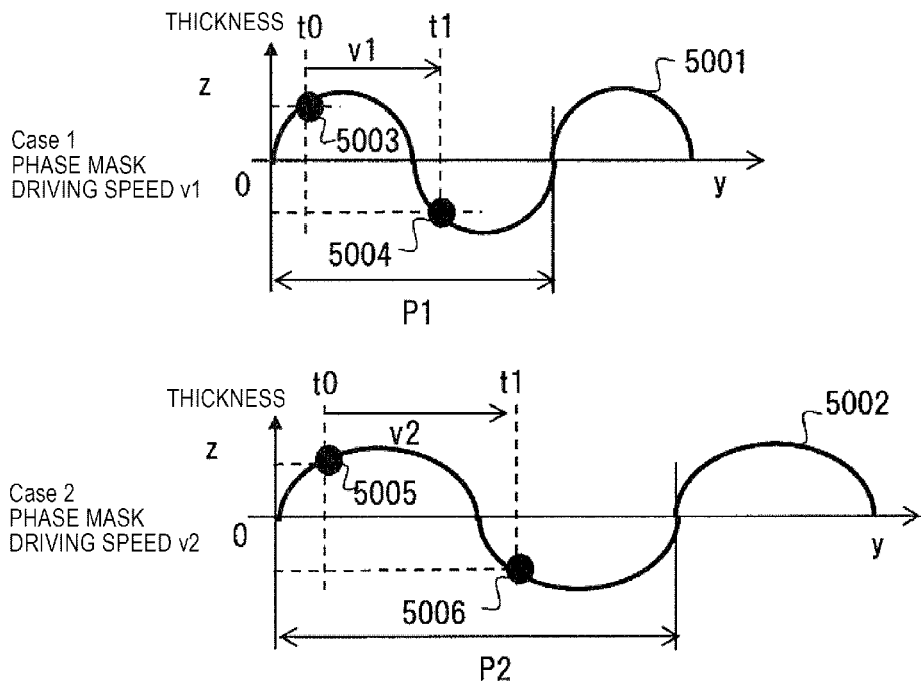
FIG. 6 is a schematic diagram representing an embodiment of driving of the phase mask of the optical information recording and reproducing device.

The upper diagram in FIG. 6 is a diagram when the phase mask moves at a speed v1. The irradiation position of mask moves from 5003 to 5004 during the change of time from t0 to t1. The period of the convex and concave portions on the mask surface at this time is given P1.

The lower diagram in FIG. 6 is a diagram when the phase mask moves at v2 that is faster than the speed v1. At this time, in order to make a change in the thickness direction of the mask caused by the change of the irradiation position of the mask from 5005 to 5006 the same as the change from 5003 to 5004 in the upper diagram, a period P2 of the convex and concave portions on the mask surface may be set as illustrated in following Equation (1).

$$P2 = \frac{P1 \times v2}{v1} \qquad (1)$$

It is known from the above description that when the driving speed of the phase mask changes, the period of the convex and concave portions is formed on the mask surface in a manner in which a ratio of the driving speed of the phase mask that crosses the incident light flux at an arbitrary position on the phase mask and the period of the convex and concave portions on the mask surface at the position is constant. As illustrated by the graph at the right of FIG. 1, since the change of the driving speed v of the phase mask is represented as a function of displacement y of the phase mask in the y-axis direction, the change of the period P of the convex and concave portions on the surface of the phase mask is also represented as a function of displacement y of the phase mask in the y-axis direction.

Accordingly, the speed of change of the convex and concave portions on the surface of the phase mask that passes through the light flux 306 can be constant even though the driving speed of the phase mask changes, and the speed of a phase change in the page and between pages of the light flux 306 can be constant.

According to the description so far, it is possible to realize an increased number of multiplexing in recording by uniforming media consumption in angle-multiplexed recording and uniform recording conditions for respective pixels in the page and between pages. It is also possible to realize a high degree of multiplexing in angle-multiplexed recording and secure stabilized recording performance.

Although the speed of a phase change of the light flux 306 is constant in the present embodiment for simplification of description, conditions of setting the speed of a phase change to be greater than or equal to a certain speed or less than or equal to a certain speed depending on the recording and reproducing performance are also considered. Setting the speed to be greater than or equal to a certain speed is realizable by imposing restrictions on the ratio of the driving speed and the period of the convex and concave portions on the mask surface in a manner of satisfying the predetermined condition.

Figure 5:
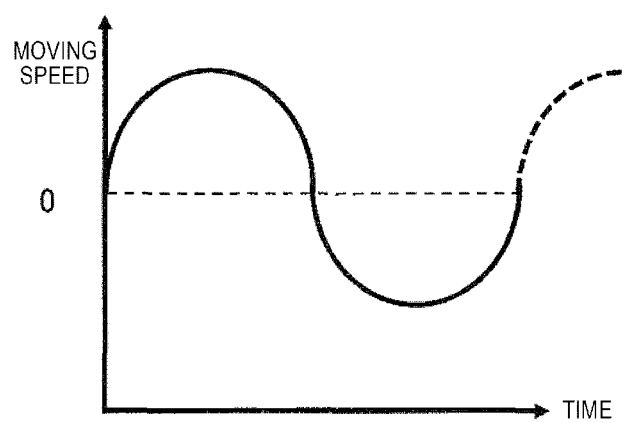
FIG. 5 is a schematic diagram representing an embodiment of driving of the phase mask of the optical information recording and reproducing device.

The case where the driving speed of the phase mask changes non-linearly as illustrated in FIG. 5 is illustrated as an example in the present embodiment, but the driving speed of the phase mask may be changed linearly.

Although the convex and concave portions of the phase mask are illustrated as having a fixed period in the present embodiment for simplification of description, arranging the convex and concave portions randomly on the surface of the phase mask is also considered in order to randomize the phase of the incident light flux. In this case, the period of the convex and concave portions on the mask surface may be formed in a manner in which a ratio of the driving speed of the phase mask that crosses the incident light flux at an arbitrary position on the phase mask and the minimum value or the average value of the intervals between the convex and concave portions on the mask surface becomes constant.

Although the method of adding the convex and concave portions on the surface of the phase mask is described in the present embodiment in order to change the phase of the light flux 306, in addition to this method, for example, there is a method, as a method of changing the phase of the light flux, of embedding a substance having a different refractive index in a plate such as a glass plate periodically or randomly. The present application defines a relationship between the driving speed of the phase mask that crosses the incident light flux at an arbitrary position on the phase mask and a method of adding phase on the mask surface and thus does not impose any limits on the method of changing the phase of the light flux.

Second Embodiment

A second embodiment of the present invention will be described according to the appended drawings. The basic optical system configurations of the recording and reproducing device 10 for the optical information recording medium and the pickup 11 in the present embodiment are the same as in FIG. 2 and FIG. 3. Thus, description thereof will be omitted.

Figure 7:
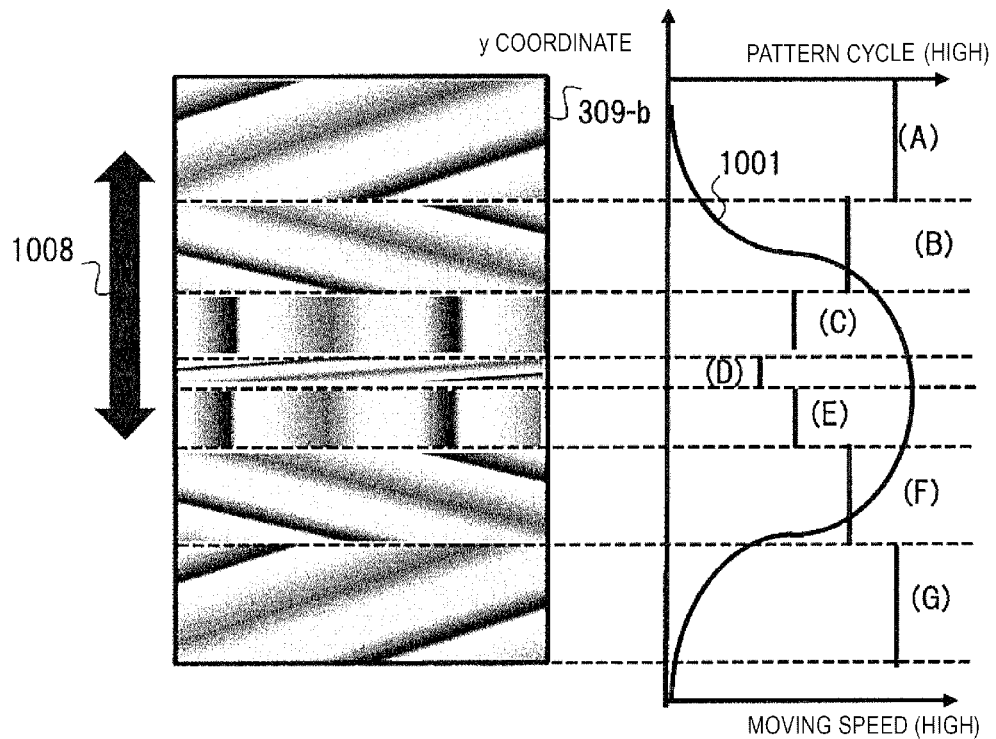
FIG. 7 is a schematic diagram illustrating an embodiment of the phase mask of the optical information recording and reproducing device, the driving speed of the phase mask, and the pattern cycle.

FIG. 7 illustrates a phase mask of the optical information recording and reproducing device 10 in the present embodiment. Since the phase mask in the present embodiment has the same function as in the first embodiment of the present invention, the phase mask will be distinguished by adding "-b" to the reference number of the phase mask in the first embodiment.

In the phase mask in FIG. 7, the period of the convex and concave portions on the mask surface is changed for each predetermined area in the y-axis direction that is the same as the driving direction 1008 as illustrated by the graph at the right of FIG. 7. A relationship between the change of the period of the convex and concave portions on the mask surface and the moving speed is the same as in the first embodiment of the present invention.

With this configuration, it is possible to facilitate working of the convex and concave portions on the surface of the phase mask and achieve substantially the same effect when compared with the first embodiment of the present invention.

The contents such as the relationship between the light flux with which the phase mask is irradiated and the driving speed of the phase mask, the change of the driving speed of the phase mask, and the pattern of the surface of the phase mask, disclosed in the description of the first embodiment of the present invention, are also applied to the present embodiment in the same manner.

Third Embodiment

A third embodiment of the present invention will be described according to the appended drawings. The recording and reproducing device 10 for the optical information recording medium in the present embodiment is the same as in FIG. 2. Thus, description thereof will be omitted.

Figure 8:
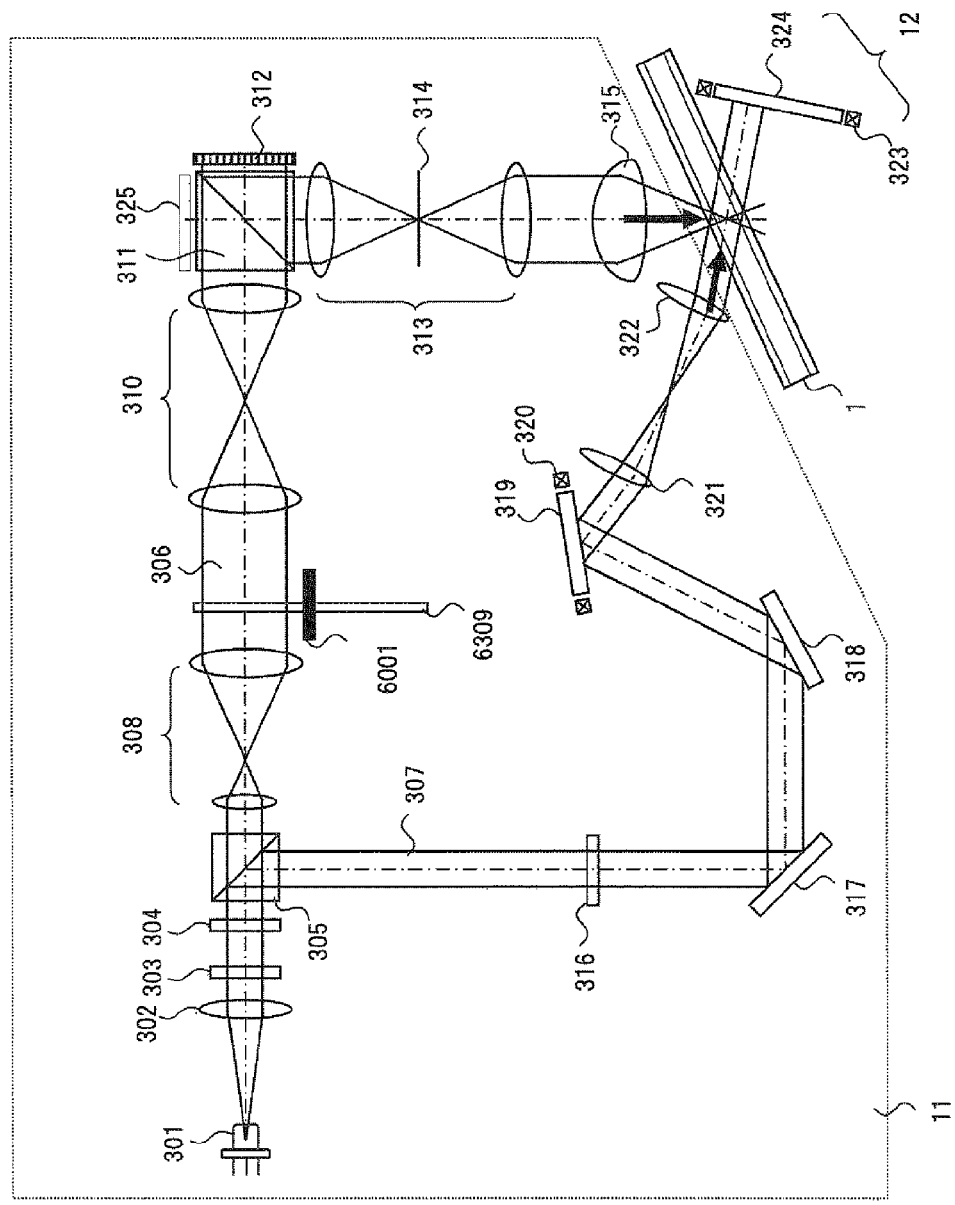
FIG. 8 is a schematic diagram representing an embodiment of the optical information recording and reproducing device.

FIG. 8 illustrates a recording principle in an example of the basic optical system configuration of the pickup 11 in the optical information recording and reproducing device 10 in the present embodiment. Constituents having the same function as those in the diagram FIG. 3 of the principle in the first embodiment of the present invention will be given the same reference signs, and description thereof will be omitted. 6309 in FIG. 8 is a phase mask having a shape of a disc and has a mechanism that rotates around a shaft 6001 inside a plane which is perpendicular to the light flux 306. Details of 6309 are illustrated in FIG. 9.

The phase mask 6309 has convex and concave portions that are periodically arranged in the circumferential direction on the surface of the phase mask in the same manner as the phase mask 309 in the first embodiment. The convex and concave portions are large enough with respect to the pixel pitch and are shallow enough with respect to wavelength (less than or equal to 1%). The convex and concave portions on the surface of the phase mask are assumed to have a periodic pattern at each radial position in the rotational circumferential direction.

Figure 9:
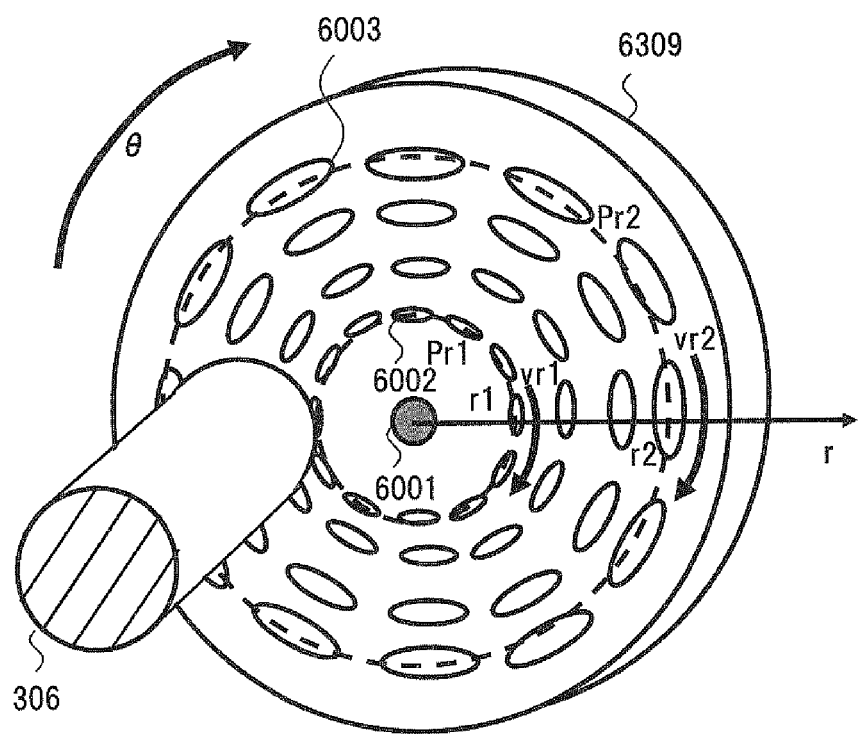
FIG. 9 is a schematic diagram illustrating an embodiment of the phase mask and a driving method thereof of the optical information recording and reproducing device.

6002 in FIG. 9 is a phase mask pattern at a radial position r1 around a rotational shaft 6001 of the phase mask 6309, and 6003 is a phase mask pattern at a radial position r2. Equation (2) represents a linear speed vr1 at the radial position r1 in the circumferential direction under the condition that the phase mask 6309 rotates at a rotational angular speed θ.

$$vr1 = r1 \times \theta \quad (2)$$

The period of the convex and concave portions in a phase mask pattern 6002 at this time is given Pr1.

Equation (3) represents a linear speed vr2 at the radial position r2 in the circumferential direction.

$$vr2 = r2 \times \theta \quad (3)$$

Such a phase mask having a shape of a disc has a different linear speed depending on the radial position. As described in the first embodiment, the speed of a phase change in the page and between pages of the light flux 306 is desirably constant or is greater than or equal to a certain speed in order to uniform recording conditions for each pixel in the page and between pages when the phase mask is driven.

In order to realize this, a period Pr2 of the convex and concave portions in the phase mask pattern 6003 at the radial position r2 is set as illustrated by Equation (4).

$$Pr2 = \frac{Pr1 \times vr2}{vr1} \quad (4)$$

As described above, when the phase mask is rotationally driven, the period of the convex and concave portions is formed on the mask surface in a manner in which a ratio of the linear speed of the phase mask that crosses the incident light flux at an arbitrary radial position and the period of the convex and concave portions at the radial position on the mask surface is constant.

Since the change of the driving speed vr of the phase mask is represented as a function of a displacement r of the phase mask in the radial direction, the change of the period P of the convex and concave portions on the surface of the phase mask is also represented as a function of the radial direction r of the phase mask.

Accordingly, it is possible to make the speed of a phase change in the page and between pages of the light flux 306 constant while information is recorded on media.

According to the description so far, it is possible to realize an increased number of multiplexing in recording by uniforming media consumption in angle-multiplexed recording and equalize recording conditions for each pixel in the page and between pages. It is also possible to secure stabilized recording performance.

Although the shape of the phase mask is a disc in the above embodiment, the shape is not necessarily limited to the above one.

The speed of a phase change of the light flux 306, the change of the driving speed of the phase mask, the random arrangement of the convex and concave portions on the surface of the phase mask, and the method of adding a phase change to the light flux 306 are the same as in the first embodiment and are not limited to the contents of the above embodiment.

Fourth Embodiment

A fourth embodiment of the present invention will be described according to the appended drawings. The recording and reproducing device 10 for the optical information recording medium in the present embodiment is the same as in FIG. 2. Thus, description thereof will be omitted.

Figure 10:
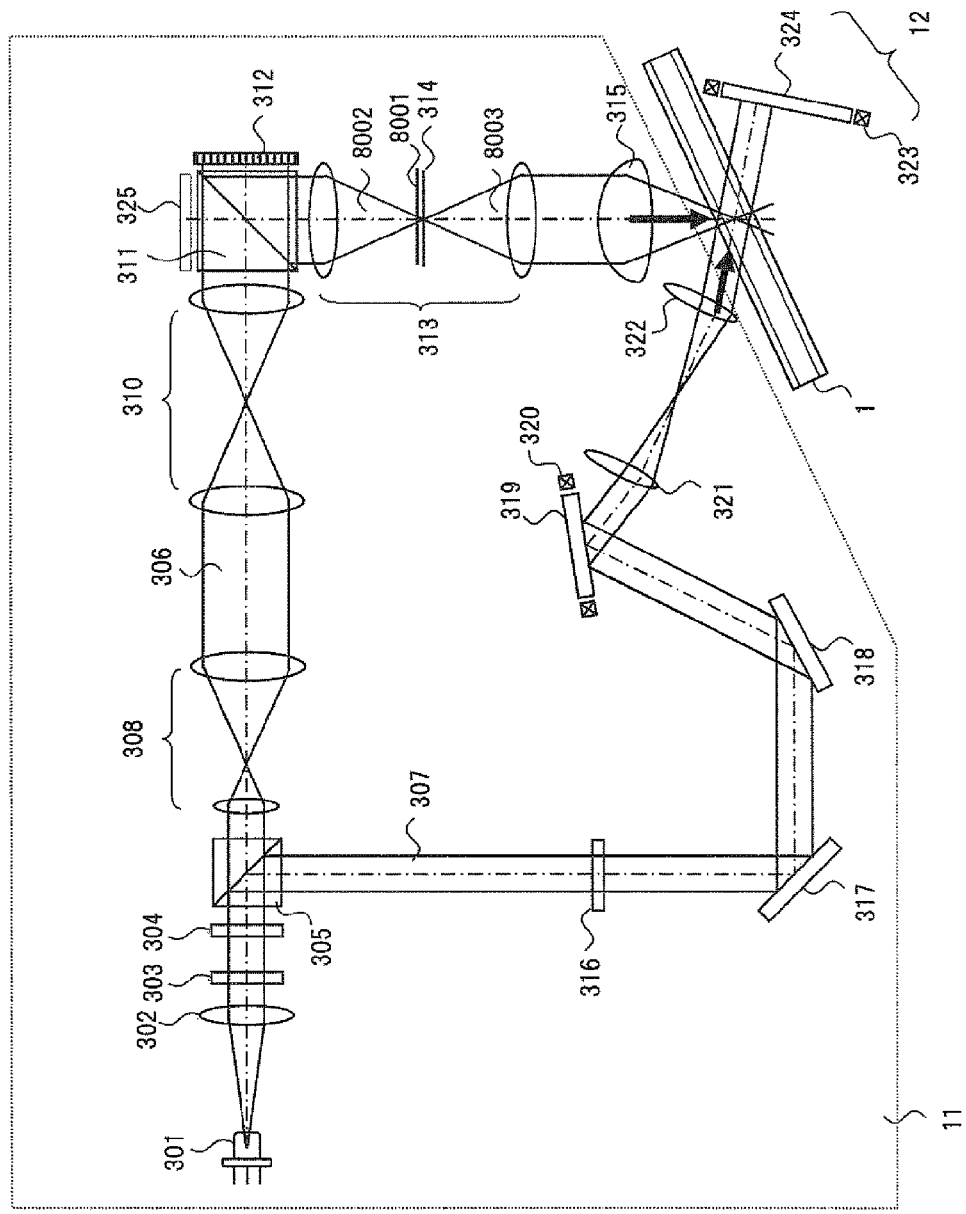
FIG. 10 is a schematic diagram representing an embodiment of the optical information recording and reproducing device.

FIG. 10 illustrates a recording principle in an example of the basic optical system configuration of the pickup 11 in the optical information recording and reproducing device 10 in the present embodiment. Constituents having the same function as those in the diagram FIG. 3 of the principle in the first embodiment of the present invention will be given the same reference signs, and description thereof will be omitted. The different point from FIG. 3 is that the phase mask 309 is removed, and an optical filter 8001 is disposed in the vicinity of the spatial filter 314.

The spatial filter 314 in FIG. 10 enables recording and reproducing performance to be improved in a manner of increasing the recording density and reducing crosstalk between adjacent books from restricting the size of a book recorded on media by forming the same Fourier image as the Fourier image recorded on media with the relay lens 313 and restricting the size of the Fourier image with the opening of the spatial filter 314.

Figure 11:
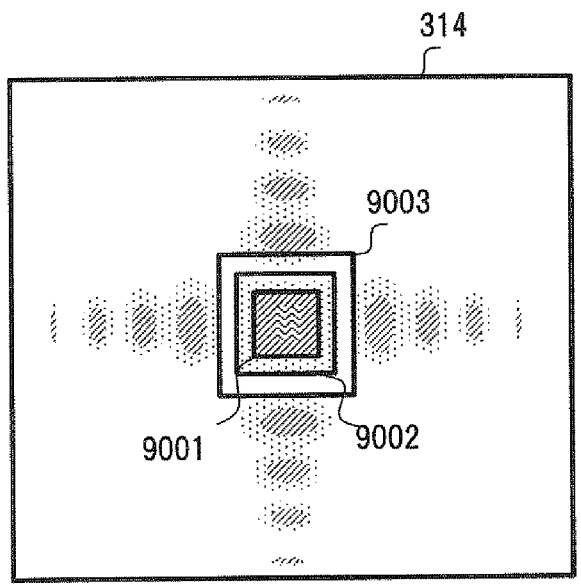
FIG. 11 is a schematic diagram illustrating an embodiment of a Fourier image of an optical information recording device.
Figure 12:
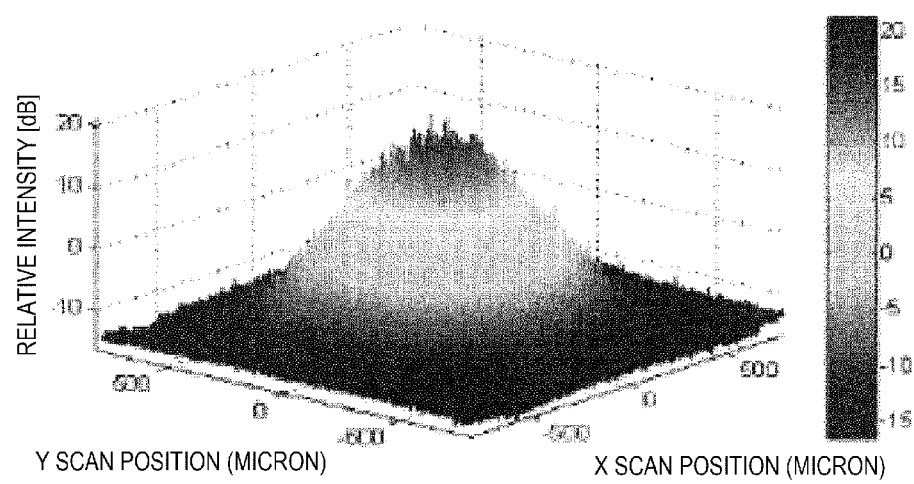
FIG. 12 is a schematic diagram illustrating an embodiment of a light intensity distribution of the optical information recording device.

FIG. 11 schematically illustrates an example of the Fourier image that is formed at the position of the spatial filter 314. 9001 in FIG. 11 illustrates a Nyquist zone, 9002 illustrates a zeroth order light region, and 9003 illustrates the opening area of the spatial filter 314. The signal light used in recording information on media is a light flux within the area of 9003 in FIG. 11. FIG. 12 is a schematic diagram illustrating a light intensity distribution in the opening area of the spatial filter 314. Light intensity normally increases toward the center of a zero time light zone, that is, light intensity increases as DC components of light increase. The part where light intensity is high consumes much media when information is recorded on media. This leads to a decreased number of recordable multiplexing in angle-multiplexed recording. The previous first and the second embodiments smooth the part where light intensity is high and secure the number of recordable multiplexing by shifting the phase of the signal light in the light flux for each adjacent pixel.

Figure 13:
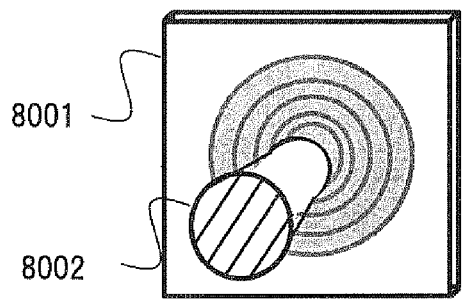
FIG. 13 is a schematic diagram illustrating an embodiment of an optical filter of the optical information recording device.
Figure 14:
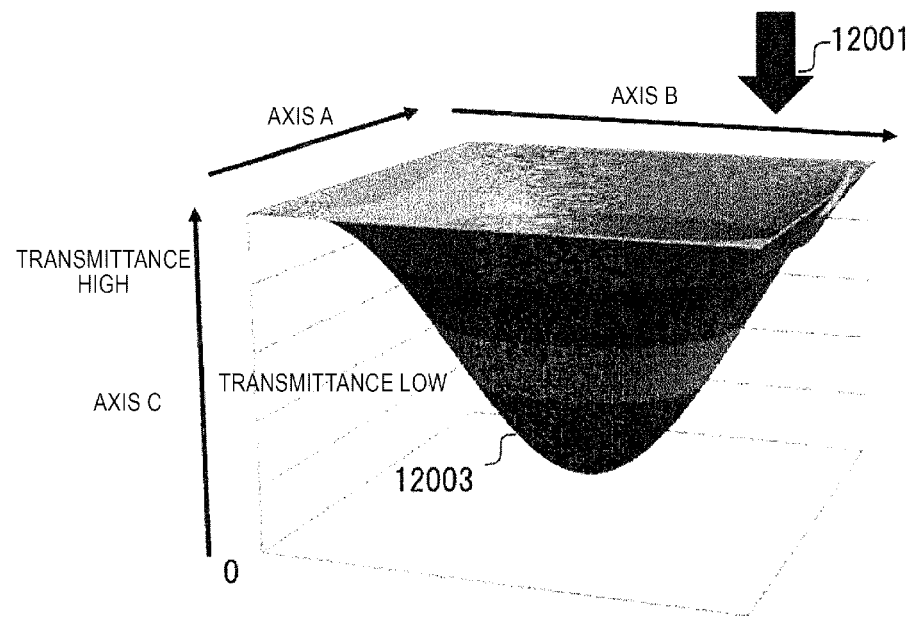
FIG. 14 is a schematic diagram illustrating a transmittance distribution of the optical filter of the optical information recording device.

FIG. 13 illustrates the optical filter 8001 in the present embodiment. The center of the filter is worked in a manner in which the transmittance of the filter changes concentrically as illustrated by 12001. A light flux 8002 is input to the central part while the optical axis of the light flux 8002 is aligned to the center. FIG. 14 illustrates a transmittance distribution of the filter. An axis A and an axis B in FIG. 14 represent coordinates in a surface of which the signal light is incident, and the optical axis is incident in the direction of the arrow 12001. An axis C represents a light transmittance at each coordinate position. As illustrated by a light transmittance distribution 12003 in FIG. 14, the central part, that is, a so-called DC part of the filter is worked as having the lowest transmittance. By causing the light flux from the opening part of the spatial filter 314 to pass through the optical filter, the light transmittance distribution is superimposed on the light intensity distribution illustrated in FIG. 11, and the light intensity distribution at the opening part is smoothed.

Since the intensity is directly controlled with respect to the same distribution as the light intensity distribution in media at the time of recording in the present embodiment, drive parts as in the first and the second embodiments of the present invention are not necessary. Therefore, it is possible to, for example, reduce the volume for driving parts in the device and suppress vibrations generated by driving parts when compared with the first and the second embodiments while realizing an increased number of multiplexing in recording and stabilized recording by uniforming media consumption in angle-multiplexed recording in the same manner as the first and the second embodiments of the present invention.

Although the tunable spectral mask 8001 is arranged close to the spatial modulator of the spatial filter 314 in the present embodiment, the tunable spectral mask 8001 may be arranged close to the object lens. In addition, the tunable spectral mask 8001 may be integrated with the spatial filter 314 as one element by adding the function of the tunable spectral mask 8001 to the spatial filter 314. In this case, the opening portion of the spatial filter 314 is configured to be provided with a mechanism of the tunable spectral mask 8001 that can change a transmittance distribution.

Although the example of suppressing the light intensity of the DC part is illustrated in the above optical filter, it is also possible to suppress light intensity in a peak frequency region other than DC in the same manner as described above.

Fifth Embodiment

Figure 15:
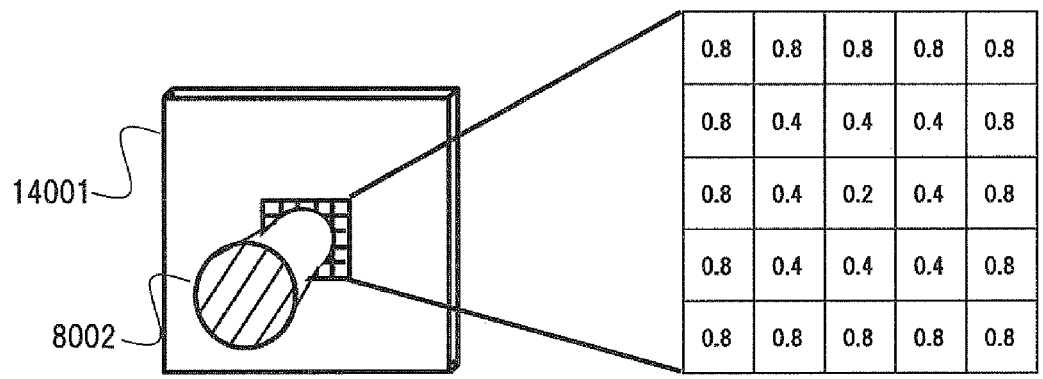
FIG. 15 is a schematic diagram illustrating an embodiment of the optical filter of the optical information recording device.

FIG. 15 is a diagram of an optical filter that has the same function as the optical filter 8001 in the fourth embodiment of the present invention.

In the present embodiment, except that an optical filter 14001 in FIG. 15 is used instead of the optical filter 8001, the configuration of the recording and reproducing device and the optical system configuration are the same as the fourth embodiment. Thus, description thereof will be omitted.

The difference between the filter 14001 and the above filter 8001 is that the filter in FIG. 15 is configured to be capable of changing a transmittance on an area basis. As illustrated at the right of FIG. 15, the filter 14001 is configured in a manner in which the surface of the filter is divided into 5×5 areas, and a transmittance can be individually set for each area.

With this configuration, it is possible to suppress the part of an arbitrary area where light intensity is high in the Fourier image in the vicinity of the spatial filter 314. Accordingly, it is possible to realize an increased number of multiplexing in recording and stabilized recording in a manner of uniforming media consumption in angle-multiplexed recording by suppressing intensity at the part that has high light intensity and occurs outside the DC part of the Fourier image. A method of using a liquid crystal element that is controllable from the outside is considered as a method for realizing the above configuration.

Although the numerical value distribution of the light transmittance is illustrated by a 5×5 matrix as an example in the present embodiment, the configuration that realizes a transmittance distribution and the resolution of the matrix are not limited to the present embodiment.

Sixth Embodiment

Figure 16:
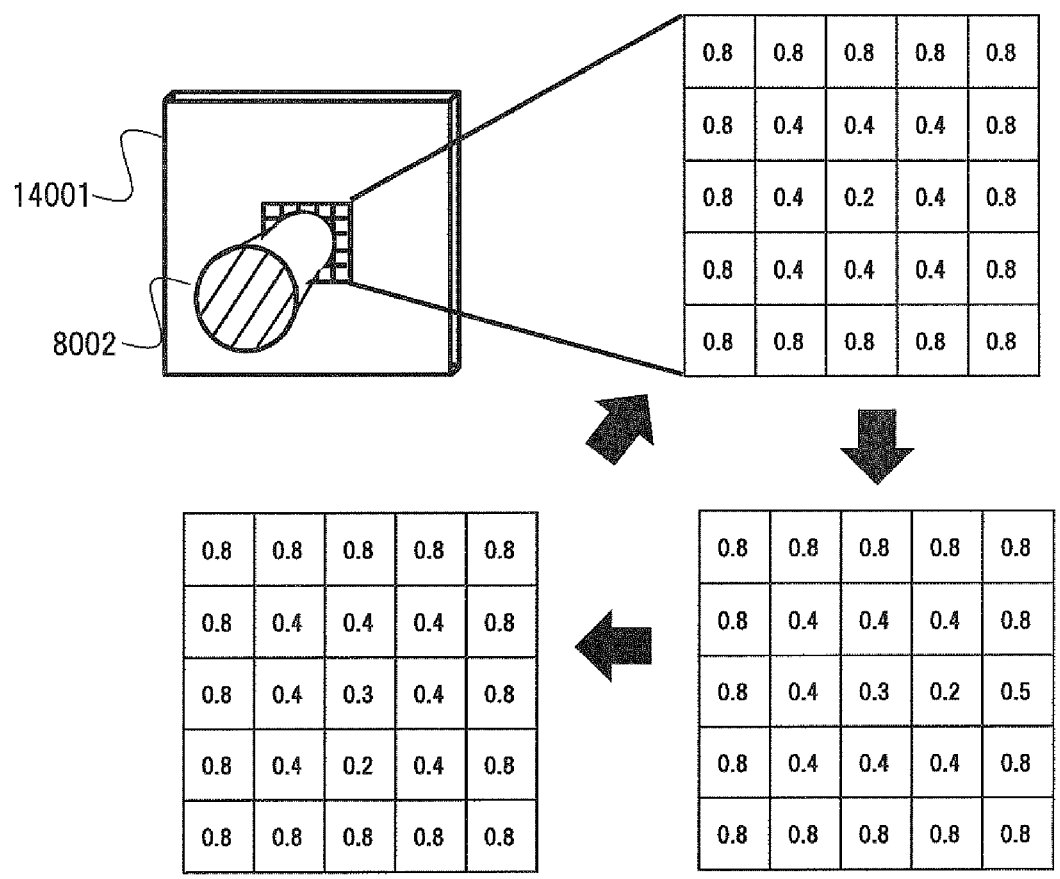
FIG. 16 is a schematic diagram illustrating an embodiment of the optical filter of the optical information recording device.

FIG. 16 is a diagram of an optical filter in a sixth embodiment of the present invention.

The configuration of the recording and reproducing device and the optical system configuration in the present embodiment are the same as the fourth embodiment. Thus, description thereof will be omitted.

The difference between the present embodiment and the fourth embodiment is that transmittance is changed for each area of the optical filter 14001 during recording, that is, the light transmittance distribution of the optical filter 14001 is changed. FIG. 16 illustrates an example of change of a light transmittance distribution between three different types.

With this configuration, it is possible to spread a light intensity distribution more evenly in an arbitrary area in the Fourier image in the vicinity of the spatial filter 314. It is also possible to realize an increased number of multiplexing in recording and stabilized recording by uniforming media consumption in angle-multiplexed recording.

The configuration that realizes a transmittance distribution, the resolution of the matrix, and the like that are illustrated in the example of the number of rows and columns of the light transmittance matrix in the present embodiment are not limited to the present embodiment in the same manner as the fourth embodiment of the present invention.

Seventh Embodiment

In the third to the fifth embodiments of the present invention, the area where light intensity is high is suppressed by controlling the intensity distribution of the signal light according to the transmittance distribution of the optical filter. However, this is considered to cause degradation of signal reproducing performance due to a decrease in the light intensity of the entire signal light and insufficient DC components.

In the present embodiment, a description will be provided for a method of correcting the above problem with signal processing.

The recording and reproducing device for the optical information recording medium that records and/or reproduces digital information by using holography in the present embodiment is the same as the recording and reproducing device in FIG. 9 in the fourth embodiment of the present invention. Thus, description thereof will be omitted.

The reproducing principle in an example of the basic optical system configuration of the pickup 11 in the optical information recording and reproducing device 10 is the same as FIG. 17 that is described in the first embodiment of the present invention. Thus, description thereof will be omitted.

Figure 18:
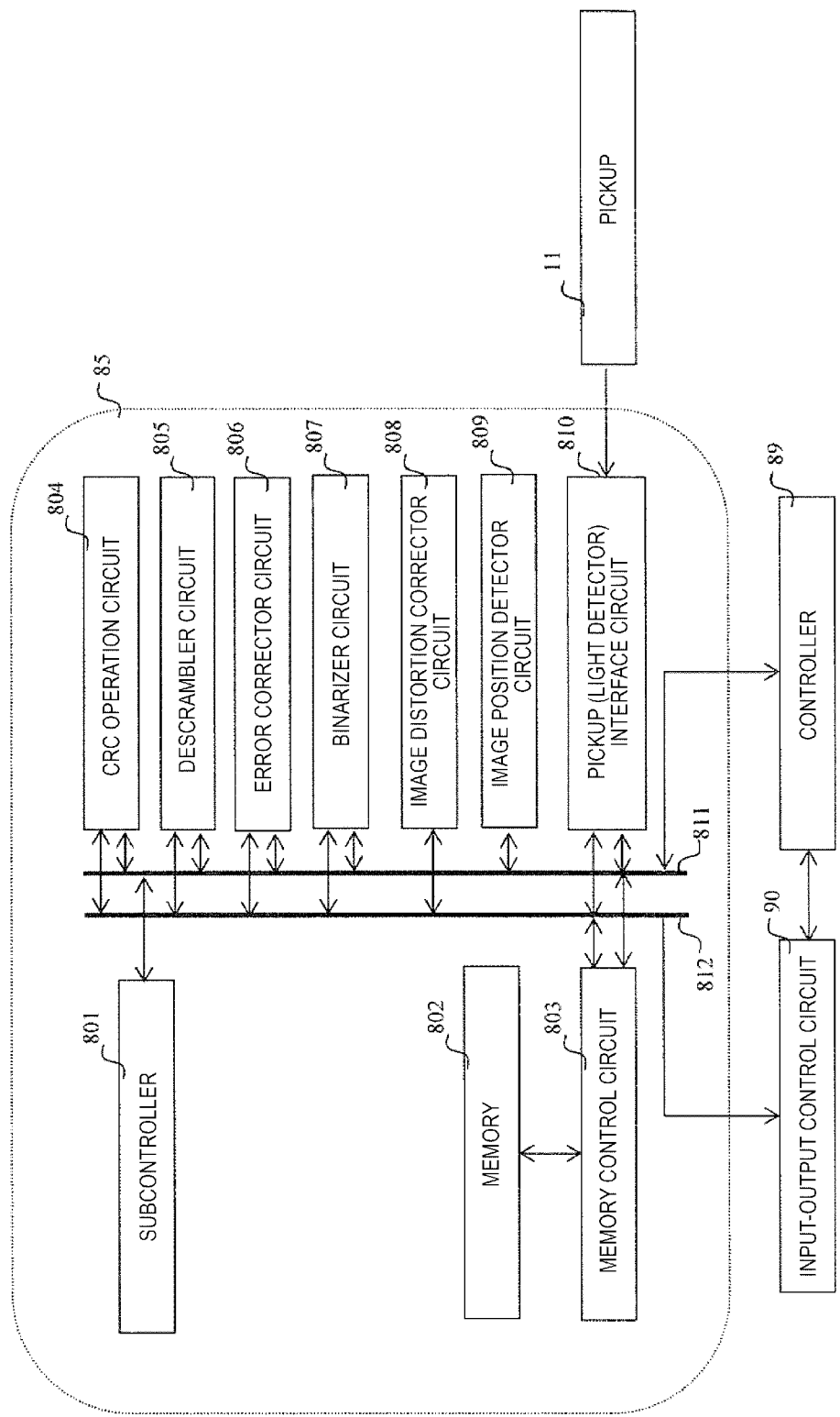
FIG. 18 is a schematic diagram illustrating an embodiment of signal processing circuit blocks of the optical information recording device.

FIG. 18 is a block diagram of the signal processing circuit 85 of the optical information recording and reproducing device 10.

When the light detector 325 in the pickup 11 detects image data, the controller 89 instructs the signal processing circuit 85 to reproduce one page of data that is input from the pickup 11. A notification of the processing instruction from the controller 89 is sent to a subcontroller 801 in the signal processing circuit 85 via a control line 811. The subcontroller 801 receives this notification and controls each signal processing circuit through the control line 811 in a manner of operating each signal processing circuit in parallel. First, the subcontroller 801 controls a memory control circuit 803 through a data line 812 in a manner in which the image data that is input from the pickup 11 via a pickup interface circuit 810 is stored on a memory 802. When the amount of data stored on the memory 802 reaches a certain amount, the subcontroller 801 controls an image position detector circuit 809 to extract the valid range of data by detecting a marker from the image data that is stored on the memory 802. Next, the subcontroller 801 controls an image distortion corrector circuit 808 to correct distortions such as inclination, magnification, and distortion of an image and convert the image data into an expected size of two-dimensional data by using the detected marker. The subcontroller 801 controls a binarizer circuit 807 to perform binarization that determines each bit data which has a plurality of bits and constitutes the two-dimensional data converted in size as "0" or "1" and store data along with outputting reproduction data on the memory 802. Next, the subcontroller 801 corrects errors included in each data string with an error corrector circuit 806, descrambles a data string to which a pseudo-random data string is added with a descrambler circuit 805, and then confirms with a CRC operation circuit 804 that errors are not included in user data on the memory 802. Afterward, the subcontroller 801 transfers the user data from the memory 802 to the input-output control circuit 90.

Operation of the present invention in the image distortion corrector circuit 808 in FIG. 15 will be described by using FIG. 19.

Figure 19:
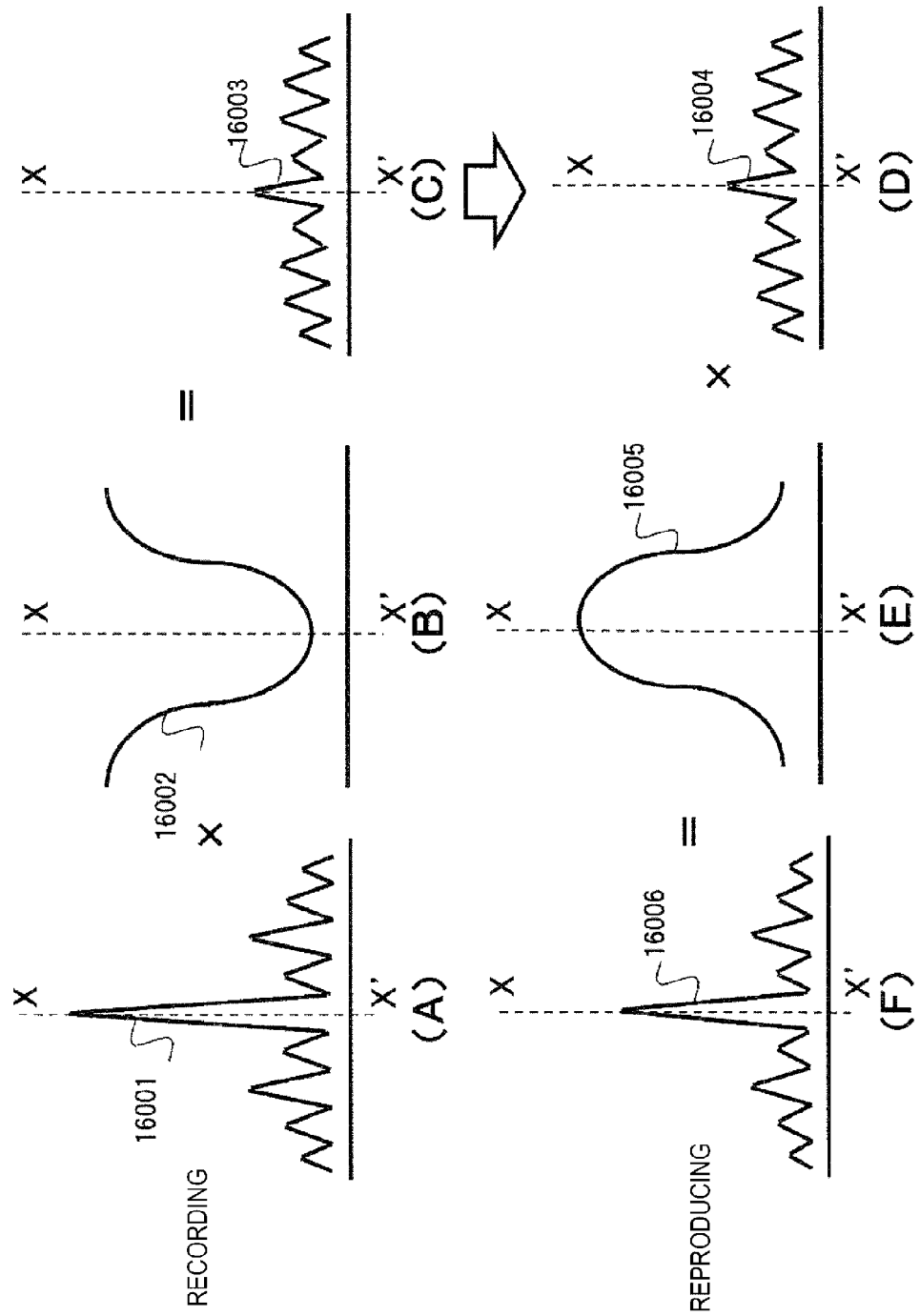
FIG. 19 is a schematic diagram illustrating an embodiment of the light intensity distribution of the optical information recording device.

FIG. 19(A) is a diagram illustrating a light intensity distribution of a light flux that is incident on the optical filter 8001 in FIG. 10. The horizontal axis indicates a spatial position on the surface that is perpendicular to the light flux, and the vertical axis indicates light intensity. The surface irradiated with the light flux is two-dimensional but is represented one-dimensionally for simplification of illustration. X-X' in FIG. 19 illustrates the center of the light flux 8002. FIG. 19(B) is a diagram illustrating a transmittance characteristic of the optical filter 8001. The horizontal axis indicates a spatial position on the surface that is perpendicular to the light flux, and the vertical axis indicates a light transmittance. X-X' in FIG. 19(B) illustrates the center of the light flux 8002 in the same manner as FIG. 19(A).

FIG. 19(C) illustrates a light intensity distribution of a light flux 8003 that is obtained by causing the light flux 8002 to pass through FIG. 19(B). The horizontal axis and the vertical axis are the same as in FIG. 19(A).

By interposing the optical filter 8001 as illustrated in the drawings, it is possible to record information on a medium according to a light intensity distribution that is smoothed in a manner in which intensity is decreased in the vicinity of the center of the intensity distribution, that is, in the vicinity of DC, and it is also possible to realize an increased number of multiplexing in angle-multiplexed recording.

However, when the original recording area is reproduced from the medium, a decrease in a reproduction signal SNR may occur due to loss of information at the DC part and a decrease in the entire intensity. A method for avoiding this will be described below.

FIG. 19(D) is a charge intensity distribution of a reproduction image that is obtained by the light detector 325 in FIG. 16. The horizontal axis in FIG. 19(D) is the spatial frequency of the reproduction image surface, and the vertical axis is charge intensity that is obtained by the light detector.

FIG. 19(E) is an electrical filter that has a characteristic which is opposite to the characteristic of the optical filter in FIG. 19(B). The electrical filter is mounted in the image distortion corrector circuit 808 in FIG. 18. The horizontal axis in FIG. 19(E) indicates the spatial frequency of the input image surface, and the vertical axis indicates an amplifier gain.

Accordingly, as illustrated in the third to the fifth embodiments of the present invention, it is possible to realize an increased number of multiplexing in recording by uniforming media consumption in angle-multiplexed recording and secure stabilized reproducing performance by securing signal intensity of the reproduction image when information is reproduced from the medium.

The present invention is not limited to the above embodiments and includes various modification examples. For example, the above embodiments are described in detail in order to facilitate understanding of the present invention, and not all of the described configurations are necessarily included in an embodiment of the present invention. In addition, it is possible to replace a part of configurations in an embodiment with configurations in another embodiment, and it is also possible to add configurations in another embodiment to configurations in an embodiment. In addition, a part of configurations of each embodiment can be removed or replaced with another configuration, or another configuration can be added thereto.

Only control lines and information lines that are considered as necessary for description are illustrated, and not all control lines and information lines of a product are necessarily illustrated. It may be considered that almost all of the configurations are actually connected to each other.

REFERENCE SIGNS LIST 1 optical information recording medium, 10 optical information recording and reproducing device, 11 pickup, 12 reproduction reference light optical system, 13 disc cure optical system, 14 disc rotational angle detecting optical system, 81 access control circuit, 82 light source drive circuit, 83 servo signal generator circuit, 84 servo control circuit, 85 signal processing circuit, 86 signal generator circuit, 87 shutter control circuit, 88 disc rotating motor control circuit, 89 controller, 90 input-output control circuit, 91 external control device, 301 light source, 303 shutter, 306 signal light, 307 reference light, 308 beam expander, 309, 6309 phase mask, 310 relay lens, 311 PBS prism, 312 spatial light modulator, 313 relay lens, 314 spatial filter, 315 object lens, 316 polarization direction converting element, 320 actuator, 321 lens, 322 lens, 323 actuator, 324 mirror, 325 light detector, 501 light source, 502 collimating lens, 503 shutter, 504 optical element, 505 PBS prism, 506 signal light, 507 PBS prism, 508 spatial light modulator, 509 angle filter, 510 object lens, 511 object lens actuator, 512 reference light, 513 mirror, 514 mirror, 515 lens, 516 galvanometric mirror, 517 actuator, 518 light detector, 519 polarization direction converting element, 520 driving direction, 521 optical block, 8001, 14001 optical filter

The invention claimed is:

1. An optical information recording device that records multiple pieces of two-dimensional page data on an optical information recording medium, comprising:
   a light source that emits a light beam;
   a polarization beam splitter that separates the light beam into reference light and signal light;
   a phase mask that adds phase information to the signal light; and
   a lens that irradiates the optical information recording medium with the reference light and the signal light and records information by causing both light to interfere, wherein the phase mask has convex and concave portions on a surface that is irradiated with the signal light, and given that a positional coordinate on the irradiated surface in a predetermined direction is y, the period of the convex and concave portions or the minimum interval of the convex and concave portions is a function of y.

2. The optical information recording device according to claim 1, wherein given that a distance of the phase mask from a predetermined position is r, the period of the convex and concave portions or the minimum interval of the convex and concave portions is a function of r.

3. The optical information recording device according to claim 2, wherein the phase mask moves rotationally around an axis in a direction that is perpendicular to the surface irradiated with the signal light.

* * * * *